United States Patent
Atyam et al.

(10) Patent No.: US 9,952,961 B2
(45) Date of Patent: *Apr. 24, 2018

(54) ASSESSING RISK OF SOFTWARE COMMITS TO PRIORITIZE VERIFICATION RESOURCES

(71) Applicant: International Business Machines Corporation, Armonk, NY (US)

(72) Inventors: Balaji V. Atyam, Austin, TX (US); Nicholas E. Bofferding, Cedar Park, TX (US); Andrew Geissler, Pflugerville, TX (US); Michael C. Hollinger, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/868,628

(22) Filed: Sep. 29, 2015

(65) Prior Publication Data
US 2017/0091072 A1  Mar. 30, 2017

(51) Int. Cl.
G06F 9/44 (2006.01)
G06F 9/45 (2006.01)
G06F 11/36 (2006.01)
G06F 9/445 (2018.01)

(52) U.S. Cl.
CPC ............ *G06F 11/3616* (2013.01); *G06F 8/65* (2013.01); *G06F 8/70* (2013.01)

(58) Field of Classification Search
None
See application file for complete search history.

(56) References Cited

U.S. PATENT DOCUMENTS

| 6,219,805 | B1 | 4/2001 | Jones et al. | |
|---|---|---|---|---|
| 8,423,960 | B2 | 4/2013 | Farchi et al. | |
| 8,495,583 | B2* | 7/2013 | Bassin | G06F 11/008 717/124 |
| 8,782,606 | B1 | 7/2014 | Cohen et al. | |
| 8,856,725 | B1 | 10/2014 | Anderson et al. | |
| 2004/0194055 | A1* | 9/2004 | Galloway | G06F 8/76 717/101 |
| 2006/0059253 | A1* | 3/2006 | Goodman | G06Q 10/06 709/223 |

(Continued)

OTHER PUBLICATIONS

IBM: List of IBM Patents or Patent Applications Treated as Related (Appendix P), Nov. 23, 2015, pp. 1-2.

(Continued)

*Primary Examiner* — Wei Zhen
*Assistant Examiner* — Binh Luu
(74) *Attorney, Agent, or Firm* — Michael A. Petrocelli

(57) ABSTRACT

A computer-implemented method and system for assessing risk of a software program and software updates to a program to prioritize verification resources, which includes receiving code for a software product for a testing assessment. The code is analyzed according to a risk assessment criteria, and the risk assessment criteria includes risk assessment factors. The risk assessment factors for the code are weighted as part of the criteria. A risk assessment score of the code is determined based on the criteria. Testing resources are allocated in response to the risk assessment score.

13 Claims, 4 Drawing Sheets

(56) References Cited

U.S. PATENT DOCUMENTS

| | | | |
|---|---|---|---|
| 2010/0058313 A1* | 3/2010 | Hansmann | G06F 8/68 |
| | | | 717/168 |
| 2011/0247069 A1* | 10/2011 | Slater | G06F 21/577 |
| | | | 726/22 |
| 2013/0019315 A1 | 1/2013 | Chen et al. | |
| 2013/0074038 A1 | 3/2013 | Fox et al. | |
| 2013/0081134 A1* | 3/2013 | Glew | G06F 21/552 |
| | | | 726/22 |
| 2013/0346956 A1* | 12/2013 | Green | G06F 8/65 |
| | | | 717/168 |
| 2014/0096113 A1* | 4/2014 | Kuehlmann | G06F 11/3676 |
| | | | 717/126 |
| 2015/0058822 A1* | 2/2015 | Elias | G06F 8/71 |
| | | | 717/123 |
| 2015/0100940 A1* | 4/2015 | Mockus | G06F 8/70 |
| | | | 717/101 |
| 2015/0293837 A1* | 10/2015 | Rajamanickam | G06F 11/3676 |
| | | | 717/130 |
| 2016/0283344 A1 | 9/2016 | Brealey et al. | |
| 2017/0115962 A1* | 4/2017 | Ben-Tzur | G06F 8/24 |

OTHER PUBLICATIONS

Pending U.S. Appl. No. 14/947,216, filed Nov. 20, 2015, entitled "Assessing Risk of Software Commits to Prioritize Verification Resources" pp. 1-30.

Disclosed Anonymously, "Method to determine confidence of quality of software by profiling the developer based on a confidence metric generated from static source analysis coupled correlated with commit history", IP.com No. 000236463, Electronic Publication: Apr. 29, 2014, pp. 1-4.

* cited by examiner

ASSESSING RISK OF SOFTWARE COMMITS TO PRIORITIZE VERIFICATION RESOURCES

BACKGROUND

The present disclosure relates to a method and system for allocating testing resources for a software program or software updates to a program within a computing environment, and more specifically, allocating testing resources based on an assessment of the software program or software update. Typically, software development environments can be used to implement software during its development. Many components of new software can be developed over a period of time. A software development project can have a life cycle which uses resources within an organization.

The resources can include a computing environment, as well as resources within the computing environment. The resources can include virtual machines or hosts, as well as software developers time, and support staff time including quality control. Resources, which further can include, time, and human resources, are a cost to an organization developing software. Therefore, constraints can exist for testing resources, such as time, and availability, for example, availability of physical hardware and virtual hosts. Thus, the resources used when software is tested are valuable to an organization, and may have constraints on their availability. A manner of assessing new and updated software for allocating testing resources would be desirable.

SUMMARY

According to an aspect of the present invention, a computer-implemented method for assessing risk of a software program and software updates to prioritize verification resources, includes receiving code for a software application for a testing assessment. The code is analyzed according to a risk assessment criteria, and the risk assessment criteria includes risk assessment factors. The risk assessment factors for the code are weighted as part of the criteria. A risk assessment score of the code is determined based on the criteria. Testing resources are allocated in response to the risk assessment score.

In another aspect according to the invention, a computer program product for assessing risk of a software program and software updates to a program to prioritize verification resources includes a computer readable storage medium having program instructions embodied therewith. The computer readable storage medium is not a transitory signal per se, and the program instructions are executable by a computer to cause the computer to perform a method, comprising: receiving code for a software application for a testing assessment; analyzing the code according to a risk assessment criteria, the risk assessment criteria includes risk assessment factors; weighting the risk assessment factors for the code as part of the criteria; determining a risk assessment score of the code based on the criteria; and allocating testing resources in response to the risk assessment score.

In another aspect according to the present invention, a computer system for assessing risk of a software program and software updates to a program to prioritize verification resources includes one or more computer processors, one or more computer-readable storage media, and program instructions stored on one or more of the computer-readable storage media for execution by at least one of the one or more processors. The program instructions, comprising: receiving code for a software application for a testing assessment; analyzing the code according to a risk assessment criteria, the risk assessment criteria includes risk assessment factors; weighting the risk assessment factors for the code as part of the criteria; determining a risk assessment score of the code based on the criteria; and allocating testing resources in response to the risk assessment score.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawing are discussed forthwith below.

DETAILED DESCRIPTION

Figure 1:
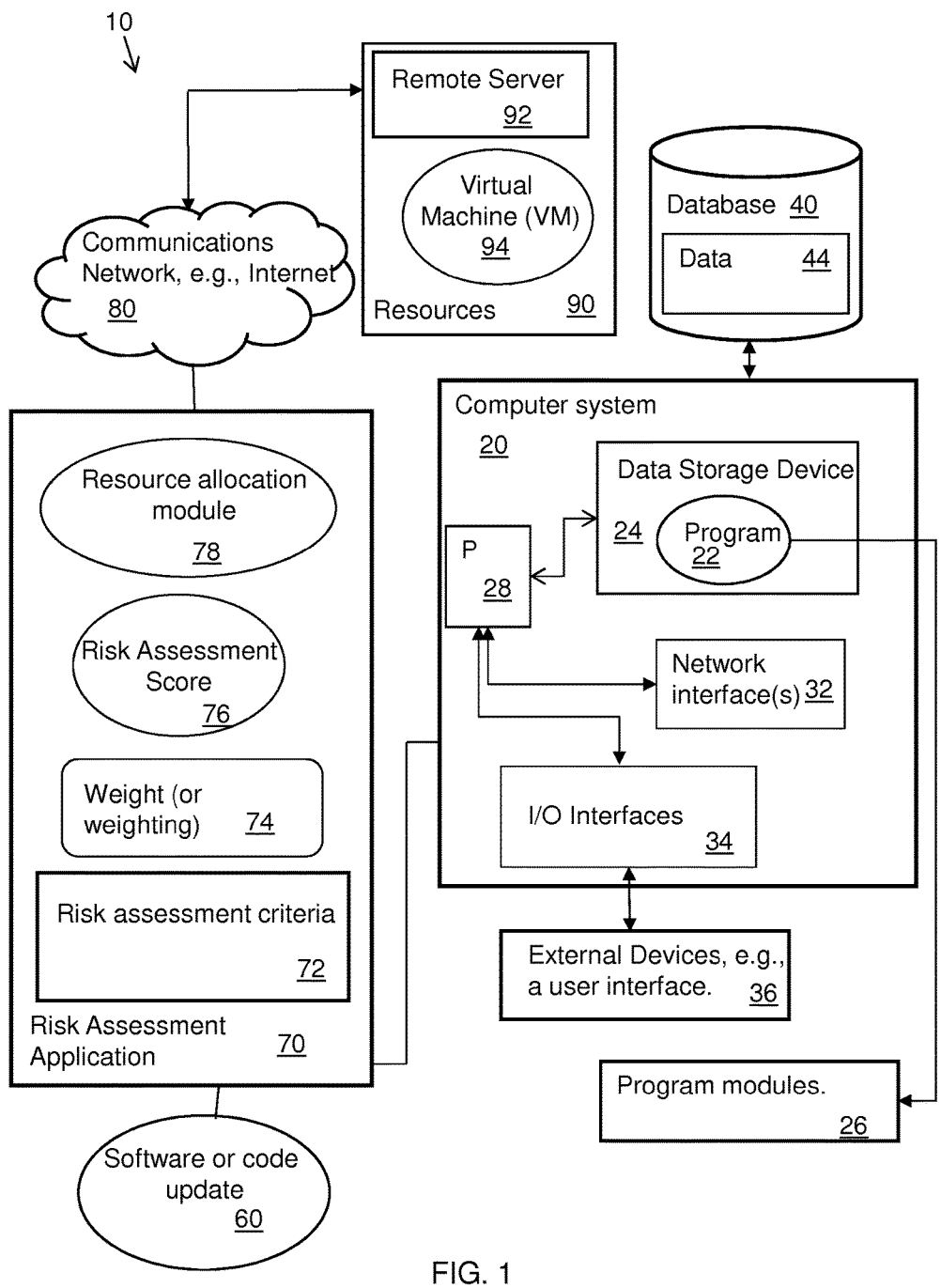
FIG. 1 is a schematic block diagram illustrating an overview of a system and methodology for assessing risk of software and software updates to prioritize verification resources according to an embodiment of the disclosure.
Figure 2:
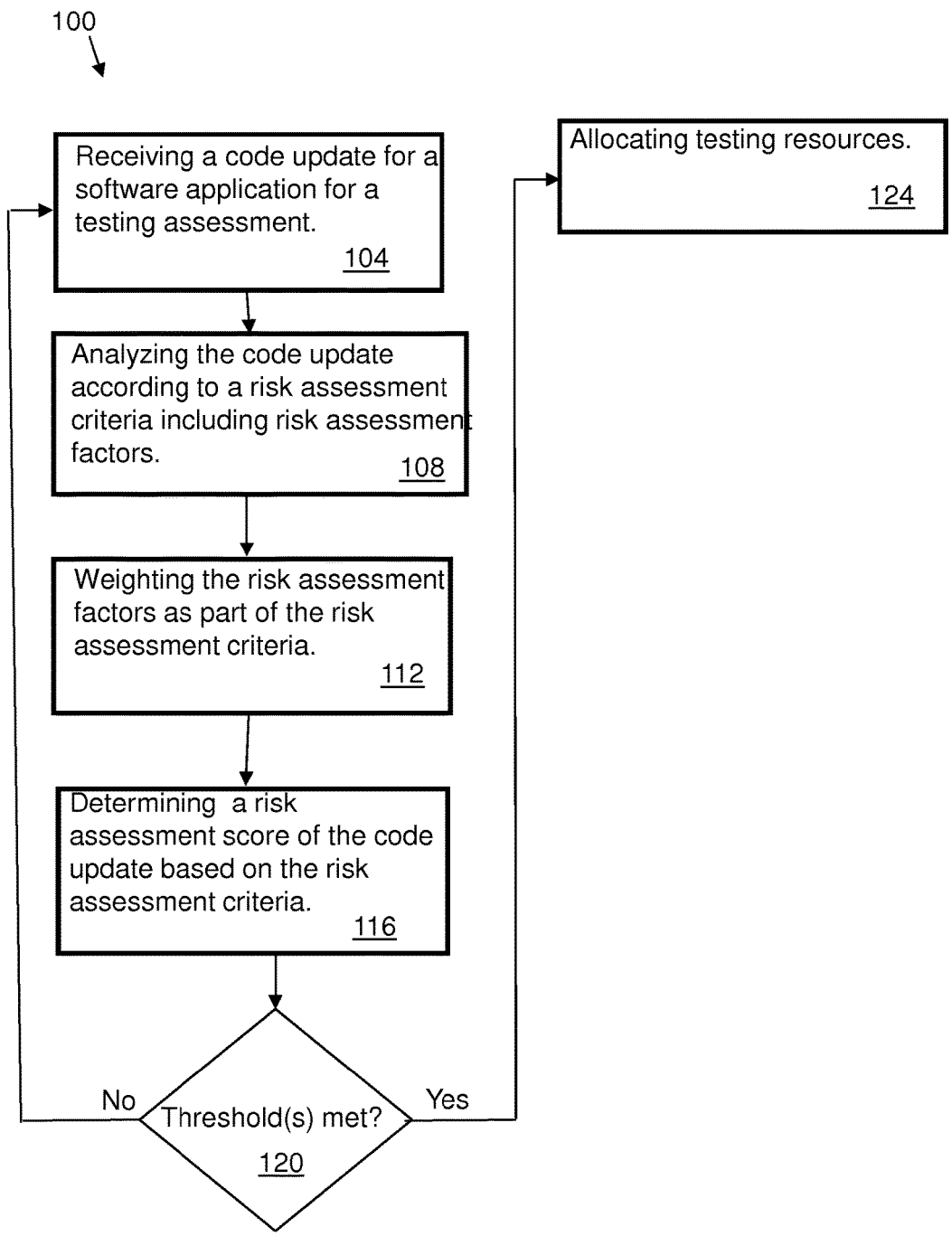
FIG. 2 is a flow chart illustrating a method for assessing risk of software and software updates to prioritize verification resources based on the system shown in FIG. 1, according to an embodiment of the disclosure.

Referring to FIGS. 1 and 2, a system 10 and method 100 for assessing risk of a software program, or software updates for a software product is provided, for prioritizing verification resources. The software program or software updates include software code (referred to herein as 'code') and code can be new software, a new software application or product, or one or more updates for an existing software product. In the embodiment shown in FIGS. 1 and 2, block 104 includes receiving a code update (or a software update) 60 to a software product (or software application) for a testing assessment.

It is understood that when developing software, software developers may break up the development process in units or code units committed piecemeal (also referred to as 'commits') throughout the life of the project. A full cycle of testing for every commit (e.g., each unit of the software) could be administered. In some cases, time and availability of resources (e.g., physical hardware or virtual machines or hosts) can lead to reduced testing. The present disclosure provides a method and system of providing risk assessment for a developers commit, and based on the risk assessment, an appropriate amount of testing can be applied to the commit or unit.

In block 108, the update is analyzed according to a risk assessment criteria 72. The risk assessment criteria includes risk assessment factors. The risk assessment factors are assigned a weight 74 (or weighted) as part of the risk assessment criteria, as in block 112. A risk assessment score 76 of the update is determined based on the risk assessment criteria, as in block 116. One or more thresholds 79 based on the risk assessment score 76 can be established to determine (as in block 120) when and how an update can be implemented, for example using testing which implements testing resources 202 shown in the functional system 200 depicted in FIG. 3. The functional system 200 depicts the components and features of the system 10 and method 100 shown in FIGS. 1 and 2 showing functional interrelationships of the components of the method and system. The method can further include adjusting allocated testing resources in response to the risk assessment score, for example, using a resource allocation module 78. The method can include increasing allocated testing resources in response to a higher risk assessment score, or decreasing allocated testing resources in response to a lower risk assessment score. In one example, allocating testing resources includes: determining a first risk assessment threshold for allocating functional testing resources; determining a second risk assessment threshold for allocating regression testing; and determining a third risk assessment threshold for integration testing.

For example, one threshold based on the risk assessment score can establish when a regression test can be run. Another threshold based on the risk assessment score can establish when, for example, a regression test 204, functional test 208, or an integration test 212 can be run. Once the threshold is met, testing resources 202 can be allocated in response to the risk assessment score, as in block 124. Thereby, the code or software update can be incrementally tested and accepted into a test and/or a production environment. If a threshold is not met, the method returns to block 104 to receive another update, a revised update, or a software patch, and the process begins again.

One or more thresholds can be used to establish a criteria to implement a variety of tests, some examples of which are mentioned above, and further, other examples can include a systems test, an installation test, or a unit test 216. The embodiments of the method and system of the present disclosure, for example, the thresholds described above, can be applied to other tests defined by a software organization.

In one embodiment, an overall risk assessment score can be computed for multiple code updates. In one example, the method can receive multiple code updates for the software application. The method can include analyzing each of the multiple code updates according to the risk assessment criteria. The risk assessment factors for each of the code updates can be weighted as part of the criteria. The method then can determine an overall risk assessment score for the multiple code updates based on the criteria, and allocate testing resources in response to the overall risk assessment score.

The risk assessment factors, for example, can include: authors, reviewers, reviewing quality, testing coverage, complexity, code usage, and rate of updates. The risk assessment factors can also include assessing: a developer of the software; a complexity of the software, authors of the code (update code) or software patch, reviewers of the code update, quality, testing coverage, complexity, code usage, and a rate of updates. For example, if a developer of the software or the authors of update code have a reputation for quality, these factors can lower the risk of implementing a code update. Likewise, for example, ample testing coverage, and code update review can lower the risk of implementing a code update.

Allocated testing resources can be adjusting in response to the risk assessment. For example, allocated testing resources can be increased in response to a higher risk based on the risk assessment score. Allocated testing resources can be decreased in response to a lower risk based on the risk assessment score.

The step of allocating test resources can include: determining a first risk assessment threshold for allocating functional testing resources; determining a second risk assessment threshold for allocating regression testing resources; and determining a third risk assessment threshold for allocating integration testing resources.

The method and system of the present disclosure includes code review and test processes. The method can ascertain the quality of the code, quality of testing and test cases, as well as historical data about the software component. These features provide additional metrics and indicators to the quality of the committed unit.

The method can determine a quality of review or reviewers (e.g., software engineers reviewing the parts of a project), and give an overall risk score of multiple commits (code units) of a multi piece software project. Thus, the embodiments of the present disclosure includes calculating a reputation or overall reputation assessment of the code units or commits, and not only of a code developer, although an assessment can be made of the code developer and used in the overall reputation assessment.

The method and system of the present disclosure provides a risk assessment value to an individual commit based on a plurality of factors. Based on the risk value, the quality group and project release managers will be able to assess the amount of testing required for an individual commit, or a group of commits. This risk value could also be used by an automated test system to determine the appropriate testing level.

The risk assessment score or value can evolve over time by continuously analyzing the incoming data. The risk score or value can be determined by analyzing metrics of the risk assessment factors to arrive at the risk assessment score.

The embodiments of the method and system of the present disclosure calculates the metrics (discussed more specifically below regarding risk assessment factors) and can use the metrics to assess a risk score or value associated with a software change (e.g., update, or patch) or with a new software.

Figure 3:
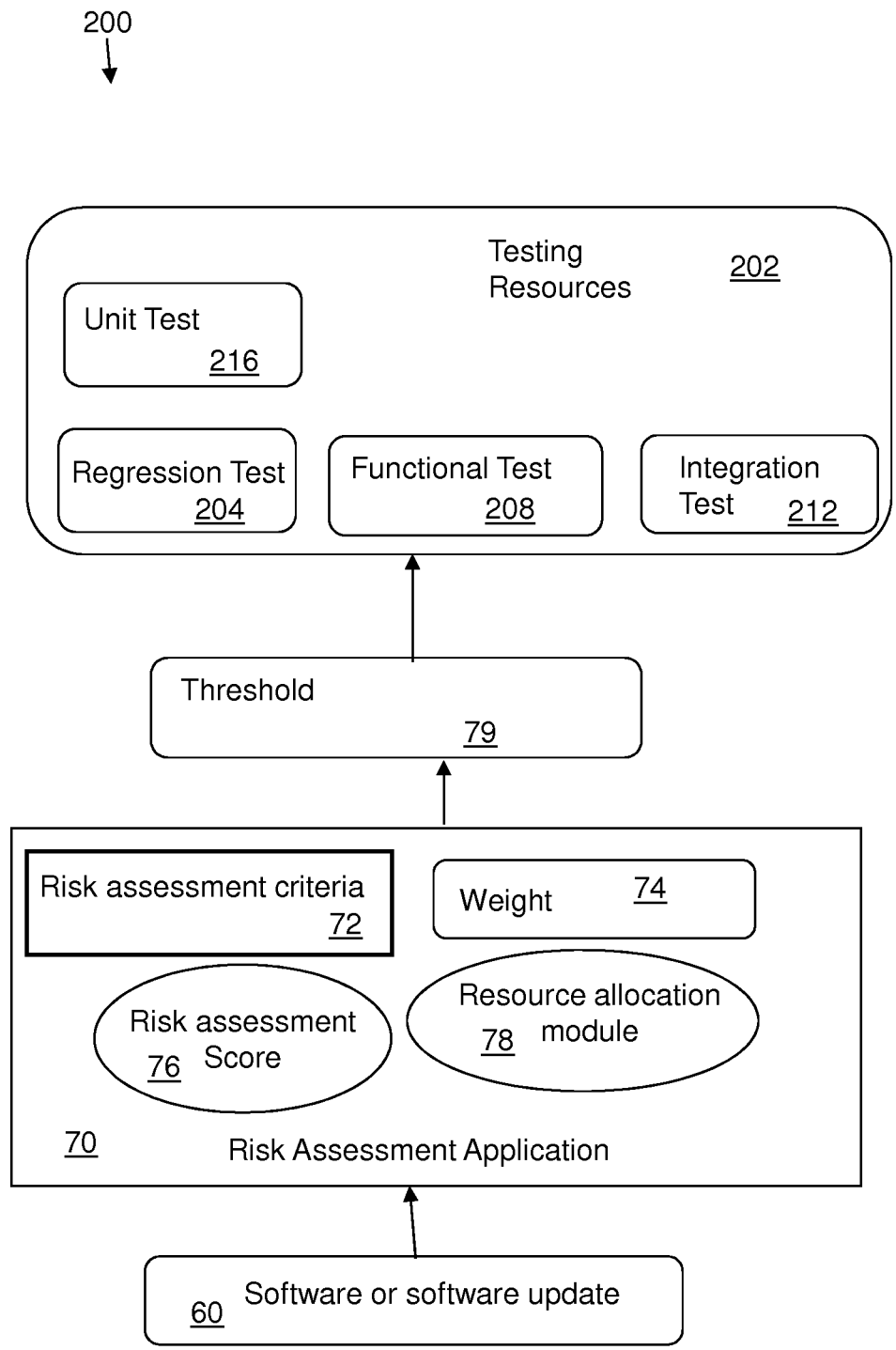
FIG. 3 is a functional block diagram depicting the functionality of a system according to an embodiment of the disclosure, and in accordance with the systems and methods shown in FIGS. 1, 2 and 3.
Figure 4:
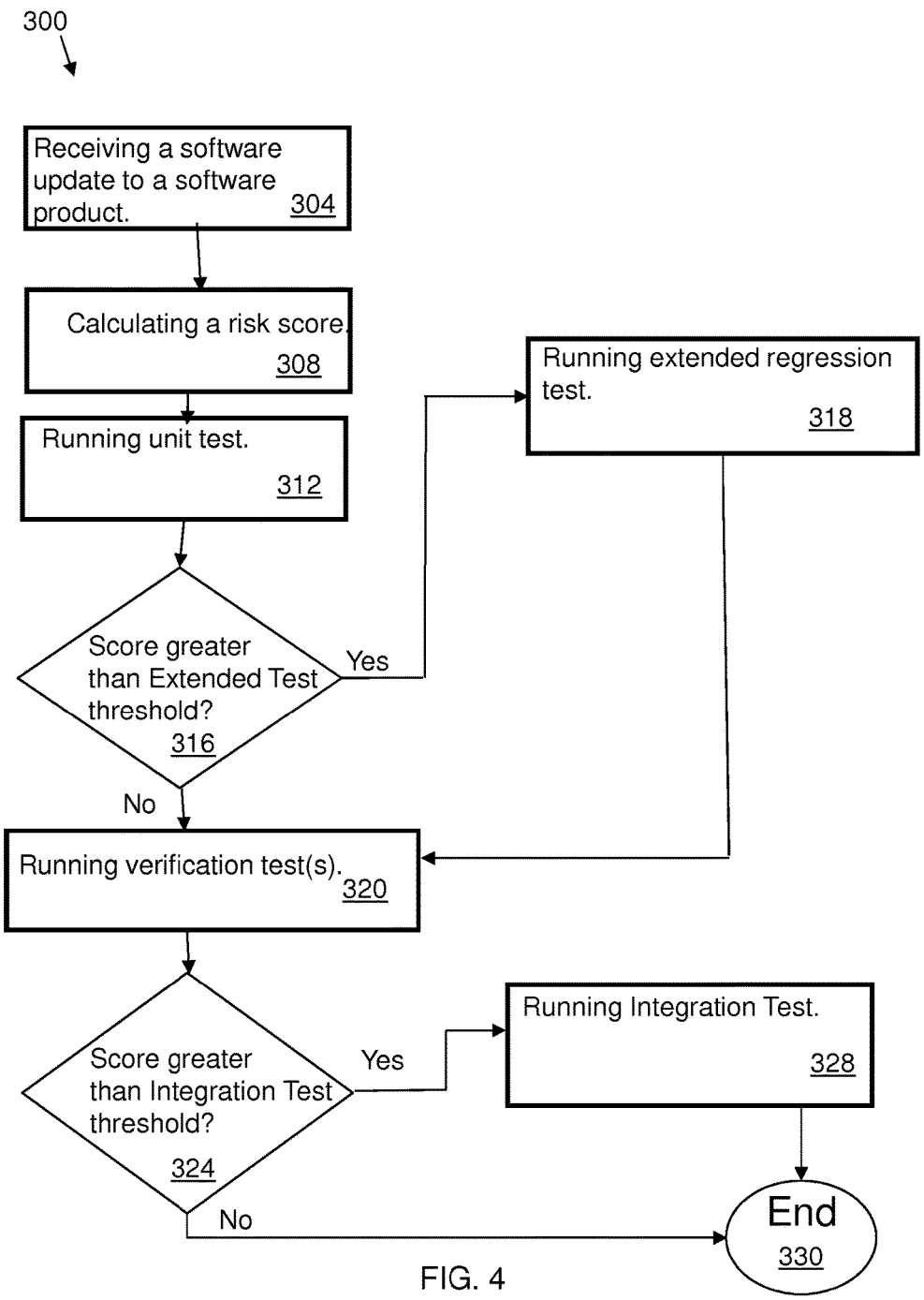
FIG. 4 is a flow chart illustrating another method for assessing risk of software and software updates to prioritize verification resources according to an embodiment of the disclosure, and in accordance with the systems shown in FIGS. 1 and 3.

Referring to FIGS. 1, 3 and 4, in another embodiment according to the present disclosure, a method 300 includes receiving a software product or a software update to a software product, as in block 304. A risk score (also referred to as a risk assessment score or value) is calculated, as in block 308. The risk score can be calculated using risk allocation factors which consider the risk of a number of inputs, which are discussed in greater detail below.

A unit test is run in block 312 of the method 300. A unit test typically includes testing the software or code update without involving other areas of software which the update will eventually interact with when fully integrated.

If a risk score meets or is greater than an extended test threshold (at block 316), the method proceeds to run an extended regression test at block 318, and then proceeds to run a verification test at block 320. That is, the risk score is used as a threshold for proceeding with an extended regression test. This prevents or significantly reduces the chances of a deleterious effect on a greater part of a software program by requiring the software update to meet or exceed a threshold before continuing with testing that can impact other software code. If the risk score is less than the extended test threshold, the method proceeds to run a verification test or tests, at block 320.

If the risk score meets or is greater than an integration test threshold (block 324), the method proceeds to run an integration test as in block 328. The method can then run the integration test and proceed to end 330. If the risk score is less than the integration test threshold, the method 300 proceeds to end 330.

The weighting of the risk assessments factors, for example, can be based on previous experience with a project. The risk factor can be specific to a risk type, but in general, a 0-10 rating can be applied against the risk (for instance, 1 is the lowest risk, and 10 is the highest risk). For example, a commit can be assumed to have a risk score of 10, and a point can be subtracted from 10 for each action that would reduce the risk. For example, for the factor of 'Quality of the review', one point could be subtracted from 10 for each person that reviewed the change. If the reviewer spent more than 1 minute per line of code reviewing, another one point can be subtracted. If the review was done as a group, another point can be subtracted. If any specific review type was used, another point can be subtracted. Thus, the more review actions, the closer the change or commit would be to lowest risk of zero.

Risk Assessment Factors

The assessment risk score can be calculated, in one embodiment, from the risk assessment factors as discussed below. It is understood that the examples and embodiments discussed below are illustrative and risk assessment factors are not limited to those explicitly discussed below. In the risk assessment factors discussed below, A-K are constants and configured by a user. The constants A-K provide a weight and standard to each risk item. The risk items are listed as follows:

A—Complexity of change;
B—Previous history of change;
C—Functional area of code and its quality history;
D—Modeled cross-component software links;
E—Quality of the coder;
F—Quality of the review of the change;
G—Quality of the review of the reviewer(s);
H—Test case coverage;
I—Frequency of changes in functional area;
J—Rate of change of the frequency of changes over time; and
K—Caller count of commit.

Constants A, B, and C, and E (Complexity of change; Previous history of change; Functional area of code and its quality history; and quality of the coder, respectively), are information inputted into the method 300 (and also can be applied to the method 100). The information can be supplied by a user or software engineer, or analyst, or derived from analysis.

Referring to constant D (modeled cross-component software links), a link can include an external piece of software, which is considered a link, in reference to the software being updated. A change or update that affects a component in an external piece of software is thereby considered a link (manual or automated), and is considered to increases a risk score. An external software may be a daemon in the same OS or an external piece of software running elsewhere. External interfaces may have multiple endpoints (e.g., Intelligent Platform Management Interface (IPMI)), and the endpoints may be assign their own sub-weights according to the present disclosure.

The constant F (Quality of the review of the change) refers to one aspect of code risk which is based on the quality and type of code review which took place for the code. Factors to consider for determining the quality and type of code review include: how many people reviewed the code; how much time did each reviewer spend looking at the code relative to the amount of code written; was the review offline or did everyone meet to do the review; what type of review was conducted; and were different methods used by different reviewers.

The constant G (quality of the review of the reviewer(s)), includes assessing the quality of the review and the person reviewing the code. Assessing the quality of the review can include ascertaining how many accepted issues (i.e., fixed by review owner) has the reviewer found in relation to the number of lines of code reviews and time spent. Such accepted issues can be a positive in assessing the reviewing. Another issue for assessing the reviewer can include how many non-accepted issues has the reviewer found in relation to the number of lines of code reviews and time spent. A criteria can be determined for assessing a reviewer's review of code, that can be rated as good or excellent, for example, fixing a code bug, as opposed to a lesser rating, for example, for a reviewer fixing a spelling error. For example, a code change vs. a comment changes can be of higher value when assessing a reviewer. In another example, a code logic change can raise a reviewer's assessment.

In another example, a reviewer's assessment can include when the reviewer completed the review based on a reviewer's ideal time for review (e.g., early morning or late night). This example is based the fact that some reviewers do their optimal code reviews early in the morning or late in the evening. The quality of the reviewers goes up if they do the review during their optimal time.

In another example, a review assessment can include when reviewer started the review (e.g., did other people already review and add comments? Being first or last to a review can impact reviewer quality. A first person to review can be unbiased by other peoples review comments, the last person to review can be biased by other peoples reviews, but will have other review comments to raise issues. In one example, determining whether comments are made in subsequent code reviews over code that has already been reviewed and not approved can be a minus for assessing a reviewer. Comments can be assessed as to their relevance and be counted toward a positive assessment for a review or reviewer. Other criteria to assess a reviewer or a review can include how many code drops has the reviewer received through the process, how much experience does the reviewer have with the project under review, and how many bugs were found post-review in code reviewed by the reviewer. For example, the more bugs found in the code, the lower the ranking for the reviewer or these can be assessed as a negative for the reviewer. The reviewer's reputation can be assessed and included in the criteria as well to assess the review.

The constant H (test case coverage) can include one aspect of code risk based on the quality of test cases added with the code. An assessment can include ascertaining: if the test cases provide direct coverage of the affected modules (e.g., are the new test cases targeted unit tests); if the test cases provide indirect coverage of clients of an affected module (e.g., software module A calls module B. Module B had a code commit, and test cases were updated for module A). For example, a commit can be iterative by a developer before it is integrated and a risk assessment is completed when it is integrated. Testing, identifying issues, and subsequent fixes during the iterative process can be relevant to a risk assessment and reflected in a risk assessment score.

In one example, a high percentage of the code being changed can result in a lower risk of problems. SLOC (Source Lines Of Code) measures the number of lines of code in a program. For example a total program may be 100,000 SLOC and a commit could be adding 1000 SLOC, thus 1% to the total size of the program is added. The amount of lines of SLOC covered can be measured when running a unit tests. If a program has 75% coverage when running a unit test, and 1000 SLOC are added with the new commit, and there is no new test coverage, the overall coverage would go down from 75%. If coverage was actually 100% in a new commit, the overall coverage for the program will go up to ~76%. If a commit increases the SLOC coverage, or at least keeps it the same, then the commit is a lower risk. If the commit lowers the SLOC coverage, then the commit can be considered a higher risk.

The constant J (rate of change of frequency of changes in functional area) can include the rate of change of commits in a particular area. If a component has steadily received a number of commits (e.g., N commits) per week, and suddenly decreases, this represents a potential risk increase or decrease (depending on the weight value being negative or positive). The constant J can measure the derivative of the frequency of change.

For example, if the constant J applies to an area, and a new commit comes into that area which is consistent with J (i.e., the same rate of change of commits), the new commit can be considered low risk because it's matching with the rate of change of frequency of changes in the code area. If the rate of change of commits is different (resulting in a different J constant), then the risk score would also change in relation to the impact on the constant J.

The constant K (caller count of commit) can include how many functions call a method that was changed by the code. Both high frequency and low frequency calls are of interest. The call count is separate from the coverage of the change, and the test case coverage. The call count can be measured on a per-language basis of the callers (e.g., static analysis of the code that depends on a particular file). The more callers, the more the code change is tested, and therefore the code if more thoroughly tested, however, the risk of a failure from the testing increases. The less callers, the less the code change is tested, but there is a decreased risk of failure. For example, the higher the K constant, the lower the overall risk to the commit.

The calculated risk score can then be used to compare multiple commits, and create an absolute ranking which is then used as an input for other processes. The constants (A-K) can be tuned (refined), e.g., weighted, to produce different results. For example, rating the rate of change (constant J) more heavily will allow the risk metric to accurately reflect a slowdown that might occur when an active project enters a maintenance mode. A risk component's weight factors may be tuned based on the stage of the release of the project. For example, entering a release mode can increase the relative contribution of the rate of change metric (constant J), and the caller count metric (constant K). Adjusting risk items or components can be done on a per-project basis. Thus, each risk calculation can have its own risk metric applied.

The risk score techniques of the embodiments of the present disclosure provides useful and meaningful aspect of a development pipeline that includes finite resources or time. The embodiments of the present disclosure provides a risk score of absolute ranking of incoming changes by risk, and thereby enables developers to prioritize higher risk changes for more testing resources or test time. For instance, an absolute ranking can include an equal measure among all commits (e.g., a risk score that can be compared for a 10 line commit or a 1000 line commit). For example, extended regression tests and integration tests can be initiated based on the risk score.

The method 100 can be implemented using the risk assessment application 70 implemented on a computer system 20 which can include computer devices such as desktop computer, or a server. The method can also be provided as a service which can be remote, for instance, including an application residing on a remote server exemplified by remote resources 90 which can include a remote server 92 and virtual machines 94.

The computer 20 is depicted generically in FIG. 1. Other devices having a computer or described as a computer or computer system may include, for example, a desktop computer, a server or a server farm. The computer in the present disclosure can be configured to send and receive electronic communications. The computer system 20 is a generic representation of a computer which may be embodied in a device such as a server for providing the method of the present disclosure as a service which can be accessible using the Internet or a network 80.

In one embodiment according to the present disclosure, the method 100 may be embodied in a program 22 (FIG. 1) embodied on a computer readable storage device, e.g., data storage device 24. The program 22 is executable by a processor 28 of a computer system 20 (to execute program steps, code, or program code). Additional data storage may also be embodied as a database 40 including data 44. The program or executable instructions may be offered as a service by a provider. The computer 20 and program 22 shown in FIG. 1 are generic representations of a computer and program that may be local to a user, or provided as a remote service, such as website accessible using a network (e.g., interacting with the Internet or cloud services). It is understood that the computer 20 also generically represents herein a computer device or a computer included in a device, such as a laptop or desktop computer, etc., or one or more servers, alone or as part of a datacenter. The computer system 20 can include a network interface 32, and input/output (I/O) interface(s) 34. The I/O interface 34 allows for input and output of data with an external device 36 that may be connected to the computer system. The network interface 32 may provide communications between the computer system and a computer network. The method steps and system components and techniques may be embodied in modules of the program 22 for performing the tasks of each of the steps of the method and system, which are generically represented in FIG. 1 as program modules 26. The program 22 and program modules 26 can execute specific steps, routines, sub-routines, instructions or code, of the program. The method of the present disclosure can be run locally on a device such as the mobile device, or can be run a service, for instance, on a remote server 92 which is accessed using the communications network 80.

It is understood that a computer or a program running on the computer may communicate with a server computer via a communications network. The communications network may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for assessing risk of a software program and software updates to a program to prioritize verification resources, the computer program product comprising a computer readable storage medium having program instructions embodied therewith, wherein the computer readable storage medium is not a transitory signal per se, the program instructions executable by a computer to cause the computer to perform a method, comprising:
   receiving code for a software application for a testing assessment;
   analyzing the code according to a risk assessment criteria, the risk assessment criteria includes risk assessment factors;
   selecting the risk assessment factors from a group consisting of: a complexity of change; a previous history of change; a functional area of code and its quality history; and a quality of the coder;
   evaluating an additional risk assessment factor of the risk assessment factors, the additional risk assessment factor includes determining when the software code includes a link directed to external software with respect to the software code, the external software including a daemon in a common operating system for running the software code and the external software, or a piece of external software running remotely, the piece of external software being run remotely and including one or more endpoints;
   determining when a change occurs to the link or external software;
weighting the risk assessment factors for the code as part of the criteria, wherein the link or the external software of the additional risk assessment factor is considered an increased risk, and the endpoints being assigned respective sub-weights in the weighting of the risk assessment factors;
   determining a risk assessment score of the code based on the criteria, before running the testing assessment of the software code; and
   allocating testing resources for the testing assessment of the software code in response to the risk assessment score.

2. The computer program product of claim 1, wherein the code is an update to the software application.

3. The computer program product of claim 1, wherein an overall risk assessment score is computed for multiple code updates.

4. The computer program product of claim 1, wherein the risk assessment factors include: authors, reviewers, reviewing quality, testing coverage, complexity, code usage, and rate of updates.

5. The computer program product of claim 1, further comprising:
   adjusting allocated testing resources in response to the risk assessment score.

6. The computer program product of claim 1, further comprising:
   increasing allocated testing resources in response to a higher risk assessment score.

7. The computer program product of claim 1, further comprising:
   selecting the risk assessment factors from an additional group consisting of: modeled cross-component software links; a quality and a type of code review for a code change; a quality of a review and a reviewer; a test case coverage and quality of the test case; a frequency of changes in a functional area; a rate of change of a frequency of changes over a time period; and a caller count of a commit including an amount of functions called by a program changed by a code change.

8. A computer system for assessing risk of a software program and software updates to a program to prioritize verification resources, the computer system comprising:
   one or more computer processors, one or more computer-readable storage media, and program instructions stored on one or more of the computer-readable storage media for execution by at least one of the one or more processors, the program instructions, comprising:
   receiving code for a software application for a testing assessment;
   analyzing the code according to a risk assessment criteria, the risk assessment criteria includes risk assessment factors;
   selecting the risk assessment factors from a group consisting of: a complexity of change; a previous history of change; a functional area of code and its quality history; and a quality of the coder;
   evaluating an additional risk assessment factor of the risk assessment factors, the additional risk assessment factor includes determining when the software code includes a link directed to external software with respect to the software code, the external software including a daemon in a common operating system for running the software code and the external software, or a piece of external software running remotely, the piece of external software being run remotely and including one or more endpoints;
   determining when a change occurs to the link or external software;
   weighting the risk assessment factors for the code as part of the criteria, wherein the link or the external software of the additional risk assessment factor is considered an increased risk, and the endpoints being assigned respective sub-weights in the weighting of the risk assessment factors;
   determining a risk assessment score of the code based on the criteria, before running the testing assessment of the software code; and
   allocating testing resources for the testing assessment of the software code in response to the risk assessment score.

9. The system of claim 8, wherein the code is an update to the software application.

10. The system of claim 8, wherein an overall risk assessment score is computed for multiple code updates.

11. The system of claim 8, wherein the risk assessment factors include: authors, reviewers, reviewing quality, testing coverage, complexity, code usage, and rate of updates.

12. The system of claim 8, further comprising:
   adjusting allocated testing resources in response to the risk assessment score.

13. The computer system of claim 8, further comprising:
selecting the risk assessment factors from an additional group consisting of: modeled cross-component software links; a quality and a type of code review for a code change; a quality of a review and a reviewer; a test case coverage and quality of the test case; a frequency of changes in a functional area; a rate of change of a frequency of changes over a time period; and a caller count of a commit including an amount of functions called by a program changed by a code change.

\* \* \* \* \*